United States Patent [19]
Pintor et al.

[11] Patent Number: 5,806,466
[45] Date of Patent: Sep. 15, 1998

[54] PET TRAINING DEVICE

[76] Inventors: Fred Pintor; Roy Ochoa, both of 852 Willow Ct., Hammond, Ind. 46320

[21] Appl. No.: 831,895

[22] Filed: Apr. 3, 1997

[51] Int. Cl.⁶ ................................................ A01K 13/00
[52] U.S. Cl. .......................... 119/770; 119/792; 119/857; 119/907
[58] Field of Search .................... 119/770, 792, 119/793, 856, 857, 907

[56] References Cited

U.S. PATENT DOCUMENTS

| | | | |
|---|---|---|---|
| 3,176,793 | 4/1965 | Hlacia | 119/857 X |
| 3,769,938 | 11/1973 | Hudziak et al. | 119/770 X |
| 4,308,629 | 1/1982 | Freeman | 119/770 X |
| 5,145,027 | 9/1992 | Petzl et al. | 119/770 X |
| 5,184,762 | 2/1993 | Nevitt | 119/907 X |
| 5,329,884 | 7/1994 | Bell | 119/857 |
| 5,435,272 | 7/1995 | Epstein | 119/770 |

*Primary Examiner*—Nicholas D. Lucchesi

[57] ABSTRACT

A pet training device including at least one thigh strap with a coupling mechanism so that the thigh strap may be worn about an upper extent of a thigh of a user. Further provided is at least one training strap having at least one couple for providing a releasable coupling between the thigh strap and a collar of a dog. Lastly, a pouch is included for containing dog food therein.

5 Claims, 3 Drawing Sheets

PET TRAINING DEVICE

BACKGROUND OF THE INVENTION

1. Field of the Invention

The present invention relates to a pet training device and more particularly pertains to training a pet such as a dog to heel.

2. Description of the Prior Art

The use of leash devices is known in the prior art. More specifically, leash devices heretofore devised and utilized for the purpose of walking devices are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,161,486 to Brown; U.S. Pat. No. 5,038,719 to McDonough; U.S. Pat. Des. 350,628 Williams; U.S. Pat. No. 5,080,045 to Reese et al.; U.S. Pat. No. 4,667,624 to Smith; and U.S. Pat. No. 4,182,272 to Taff.

In this respect, the pet training device according to the present invention substantially departs from the conventional concepts and designs of the prior art, and in so doing provides an apparatus primarily developed for the purpose of training a pet such as a dog to heel.

Therefore, it can be appreciated that there exists a continuing need for a new and improved pet training device which can be used for training a pet such as a dog to heel. In this regard, the present invention substantially fulfills this need.

SUMMARY OF THE INVENTION

In view of the foregoing disadvantages inherent in the known types of leash devices now present in the prior art, the present invention provides an improved pet training device. As such, the general purpose of the present invention, which will be described subsequently in greater detail, is to provide a new and improved pet training device which has all the advantages of the prior art and none of the disadvantages.

To attain this, the present invention essentially comprises a waist strap with a first end having a buckle attached thereto and a second end with a plurality of linearly aligned holes. Such holes are adapted for allowing the attachment of the buckle thereto so that the waist strap may be worn about a waist of a user. As best shown in FIG. 2, the waist strap has a first predetermined length. Further provided is a top thigh strap with a first end having a buckle attached thereto and a second end with a plurality of linearly aligned holes. Similar to the waist straps, the holes of the top thigh straps are adapted for allowing the attachment of the buckle thereto so that the top thigh strap may be worn about an upper extent of a thigh of a user. It should be noted that he top thigh strap has a second predetermined length which is less than the first predetermined length. Associated therewith is a bottom thigh strap with a first end having a buckle attached thereto. A second end of the bottom thigh strap has a plurality of linearly aligned holes for allowing the attachment of the buckle thereto. As such, the bottom thigh strap may be worn about a lower extent of a thigh of a user. For affording a proper fit when worn by a user, the bottom thigh strap is constructed with a third predetermined length which is less than the second predetermined length. For maintaining the relative position of the forgoing straps, a connecting strap is included. The connecting strap is formed of a closed loop with a plurality of rivets secured thereto for forming a plurality of secondary loops. As shown in FIG. 2, the waist strap is slidably situated in a top secondary loop. Further, the top thigh strap is slidably situated in an intermediate secondary loop. Also, the bottom thigh strap is slidably situated in a bottom secondary loop. In use, the connecting strap is vertically positioned against a front portion of a thigh of a user. Note FIG. 1. For reasons that will become apparent later, an O-ring is situated in a second intermediate secondary loop of the connecting strap. Further provided is a plurality of training straps each having two ends each with a quick-release pivoting couple. The quick-release pivoting couple is adapted for providing a releasable coupling between the O-ring and a collar of a dog. The training straps have a plurality of different lengths for training a dog to heel. To store the training straps a training strap storing mechanism is included. The training strap storing mechanism includes a strap formed in a closed-loop configuration with an O-ring coupled thereto. The strap of the training strap storing mechanism is slidably coupled to the waist strap such that the training straps which are not in use may be attached to the O-ring thereof via the quick-release pivoting couple thereof. Finally, a pouch is provided for containing dog food. As shown in FIG. 6, the pouch includes a rear face, a front face, a bottom face, and a pair of bellowed side faces defining a open top and an interior space. The pouch has a lid flap integrally coupled at a first end thereof to a top of the rear face thereby allowing selective closure of the interior space of the pouch. The lid flap further includes a buckle connected to a second end thereof. A closed loop couple is attached to the front face of the pouch. Such combination of a buckle and closed loop is adapted for allowing the securement of the flap over the open top of the pouch. For allowing the slidable coupling of the pouch to the waist strap, the pouch also includes an attachment loop attached to the rear face thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet training device which has all the advantages of the prior art leash devices and none of the disadvantages.

It is another object of the present invention to provide a new and improved pet training device which may be easily and efficiently manufactured and marketed.

It is a further object of the present invention to provide a new and improved pet training device which is of a durable and reliable construction.

An even further object of the present invention is to provide a new and improved pet training device which is susceptible of a low cost of manufacture with regard to both materials and labor, and which accordingly is then susceptible of low prices of sale to the consuming public, thereby making such pet training device economically available to the buying public.

Still yet another object of the present invention is to provide a new and improved pet training device which provides in the apparatuses and methods of the prior art some of the advantages thereof, while simultaneously overcoming some of the disadvantages normally associated therewith.

Still another object of the present invention is to train a pet such as a dog to heel.

Lastly, it is an object of the present invention to provide a new and improved pet training device including at least one thigh strap with a coupling mechanism so that the thigh strap may be worn about an upper extent of a thigh of a user. Further provided is at least one training strap having at least one couple for providing a releasable coupling between the thigh strap and a collar of a dog. Lastly, a pouch is included for containing dog food therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
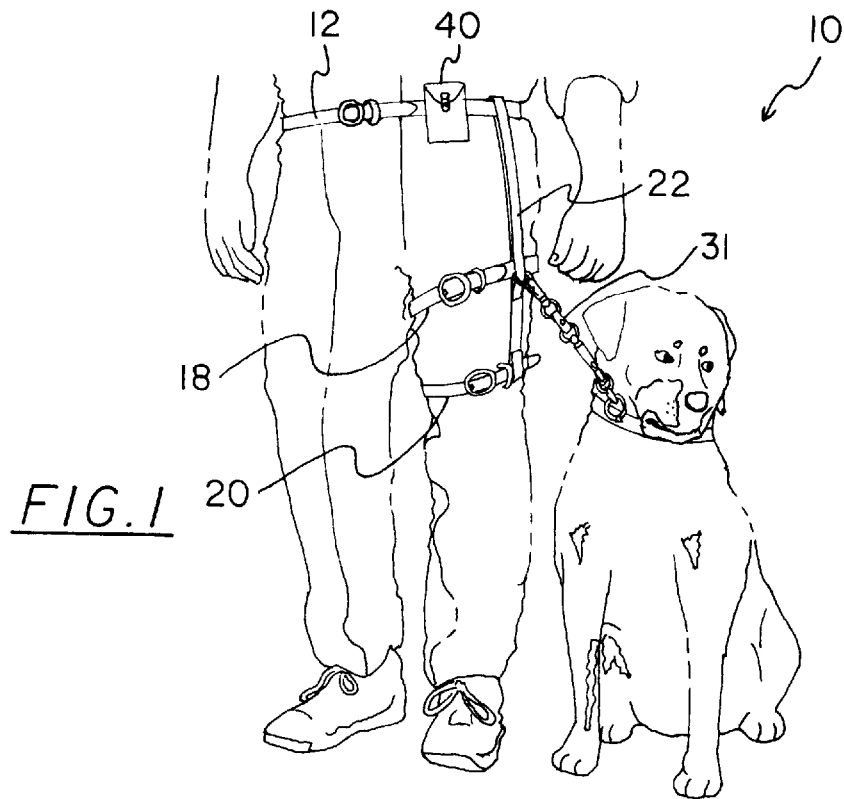
FIG. 1 is a perspective illustration of the preferred embodiment of the pet training device constructed in accordance with the principles of the present invention.

With reference now to the drawings, and in particular to FIG. 1 thereof, a new and improved pet training device embodying the principles and concepts of the present invention and generally designated by the reference numeral 10 will be described.

The present invention, the new and improved pet training device, is comprised of a plurality of components. Such components in their broadest context include a waist strap, a top thigh strap, a bottom thigh strap, a connecting strap, a plurality of training straps, and a pouch. Such components are individually configured and correlated with respect to each other so as to attain the desired objective.

Figure 2:
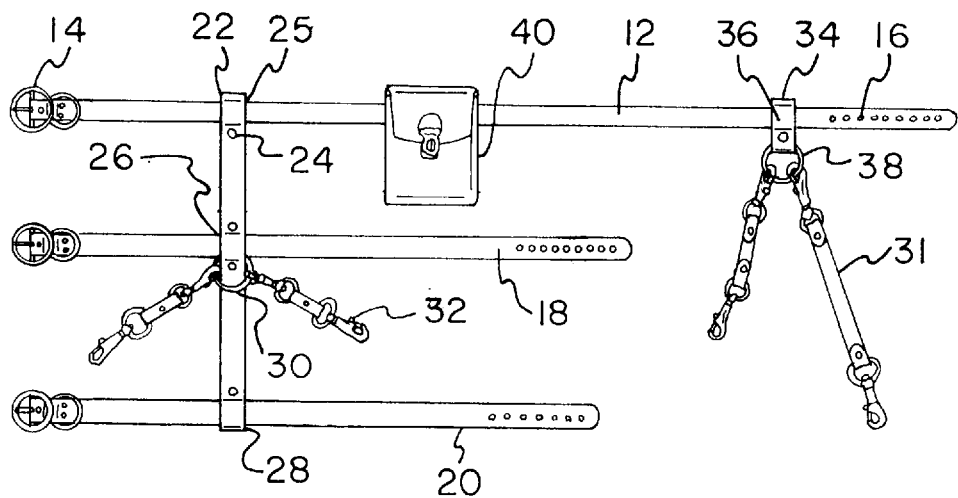
FIG. 2 is a front view of the present invention.
Figure 3:
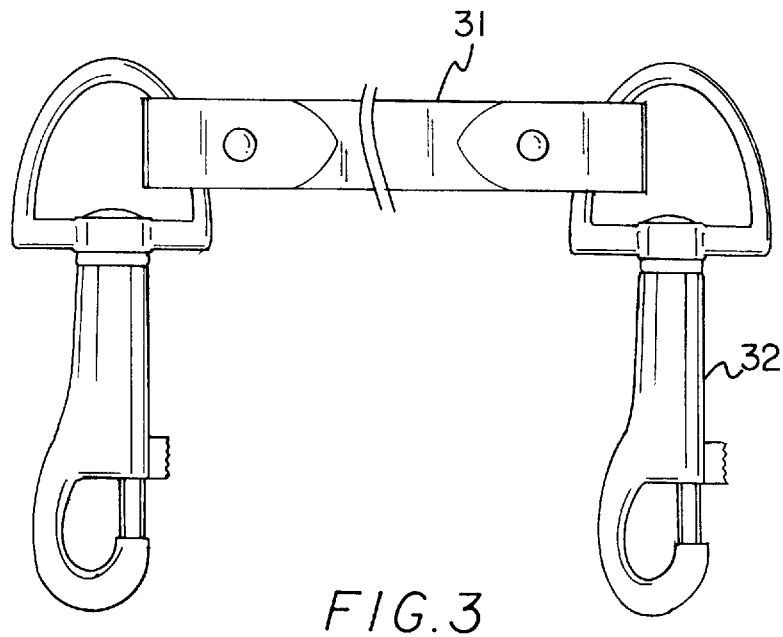
FIG. 3 is a close up view of one of the training straps of the present invention with a long length.
Figure 4:
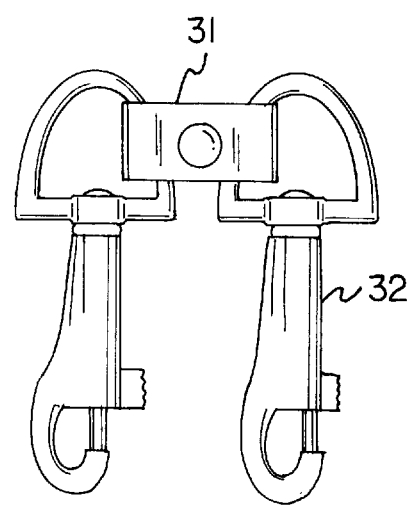
FIG. 4 is a close up view of another one of the training straps of the present invention with a shortened length.
Figure 5:
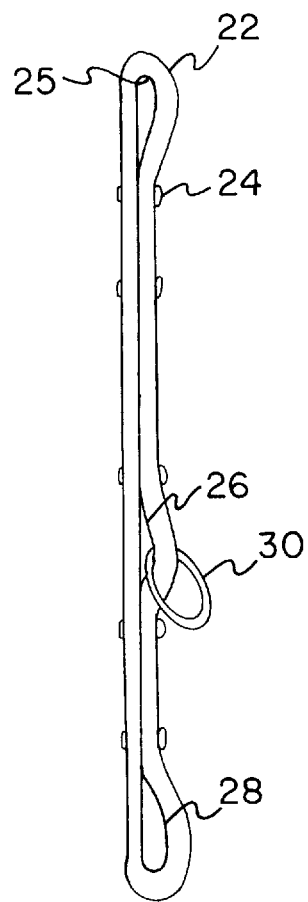
FIG. 5 is a side elevational view of the connecting straps of the present invention.

More specifically, it will be noted that the system 10 of the present invention includes a waist strap 12 with a first end having a buckle 14 attached thereto and a second end with a plurality of linearly aligned holes 16. Such holes are adapted for allowing the attachment of the buckle thereto so that the waist strap may be worn about a waist of a user. As best shown in FIG. 2, the waist strap has a first predetermined length.

Further provided is a top thigh strap 18 with a first end having a buckle attached thereto and a second end with a plurality of linearly aligned holes. Similar to the waist straps, the holes of the top thigh straps are adapted for allowing the attachment of the buckle thereto so that the top thigh strap may be worn about an upper extent of a thigh of a user. It should be noted that he top thigh strap has a second predetermined length which is less than the first predetermined length.

Associated therewith is a bottom thigh strap 20 with a first end having a buckle attached thereto. A second end of the bottom thigh strap has a plurality of linearly aligned holes for allowing the attachment of the buckle thereto. As such, the bottom thigh strap may be worn about a lower extent of a thigh of a user. For affording a proper fit when worn by a user, the bottom thigh strap is constructed with a third predetermined length which is less than the second predetermined length.

For maintaining the relative position of the forgoing straps, a connecting strap 22 is included. The connecting strap is formed of a closed loop with a plurality of rivets 24 secured thereto for forming a plurality of secondary loops. As shown in FIG. 2, the waist strap is slidably situated in a top secondary loop 25. Further, the top thigh strap is slidably situated in an intermediate secondary loop 26. Also, the bottom thigh strap is slidably situated in a bottom secondary loop 28. Preferably, the secondary loops are spaced such that the bottom and top thigh straps are spaced 4 and ½ inches apart. In use, the connecting strap is vertically positioned against a front portion of a thigh of a user. Note FIG. 1. Preferably, all of the straps are constructed from leather.

For reasons that will become apparent later, an O-ring 30 is situated in a second intermediate secondary loop of the connecting strap.

Further provided is a plurality of training straps 31 each having two ends each with a quick-release pivoting couple 32. The quick-release pivoting couple is adapted for providing a releasable coupling between the O-ring and a collar of a dog. The training straps have a plurality of different lengths for training a dog to heel. Such lengths include 2, 4, 6, and 8 inches.

To store the training straps a training strap storing mechanism 34 is included. The training strap storing mechanism includes a strap 36 formed in a closed-loop configuration with an O-ring 38 coupled thereto. The strap of the training strap storing mechanism is slidably coupled to the waist strap such that the training straps which are not in use may be attached to the O-ring via the quick-release pivoting couple thereof.

Figure 6:
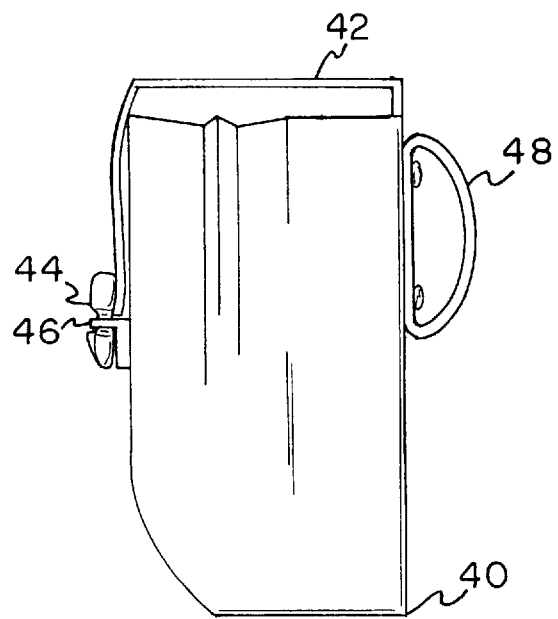
FIG. 6 is a side view of the pouch of the present invention.

Finally, a pouch 40 is provided for containing dog food. As shown in FIG. 6, the pouch includes a rear face, a front face, a bottom face, and a pair of bellowed side faces defining a open top and an interior space. The pouch has a lid flap 42 integrally coupled at a first end thereof to a top of the rear face thereby allowing selective closure of the interior space of the pouch. The lid flap further includes a buckle 44 connected to a second end thereof. A closed loop couple 46 is attached to the front face of the pouch. Such combination of a buckle and closed loop is adapted for allowing the securement of the flap over the open top of the pouch. For allowing the slidable coupling of the pouch to the waist strap, the pouch also includes an attachment loop 48 attached to the rear face thereof.

In use, present invention may be utilized to teach pets such as dogs to heal. The training straps of a longer length may be employed when first training the dog. As training progresses, the training straps of a shorter length may be utilized. A user may further conveniently provide the dog with a treat from the pouch when the dog performs in a favorable manner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pet training device comprising, in combination:

a waist strap with a first end having a buckle attached thereto and a second end with a plurality of linearly aligned holes for allowing the attachment of the buckle thereto so that the waist strap may be worn about a waist of a user, the waist strap having a first predetermined length;

a top thigh strap with a first end having a buckle attached thereto and a second end with a plurality of linearly aligned holes for allowing the attachment of the top thigh strap buckle thereto so that the top thigh strap may be worn about an upper extent of a thigh of a user, the top thigh strap having a second predetermined length which is less than the first predetermined length;

a bottom thigh strap with a first end having a buckle attached thereto and a second end with a plurality of linearly aligned holes for allowing the attachment of the bottom thigh strap buckle thereto so that the bottom thigh strap may be worn about a lower extent of a thigh of a user, the bottom thigh strap having a third predetermined length which is less than the second predetermined length;

a connecting strap formed of a closed loop with a plurality of rivets secured thereto forming a plurality of secondary loops, whereby the waist strap is slidably situated in a top secondary loop, the top thigh strap is slidably situated in an intermediate secondary loop, and the bottom thigh strap is slidably situated in a bottom secondary loop, the connecting strap adapted to be vertically positioned against a front portion of a thigh of a user;

an O-ring situated in a second intermediate secondary loop of the connecting strap;

a plurality of training straps having two ends each with a quick-release pivoting couple for providing a releasable coupling between the O-ring and a collar of a dog, wherein the training straps have a plurality of different lengths for training a dog to heel;

a training strap storing mechanism including a strap formed in a closed-loop configuration with an O-ring coupled thereto, the strap of the training strap storing mechanism slidably coupled to the waist strap such that the training straps which are not in use may be attached to the O-ring thereof via a quick-release pivoting couple thereof; and a pouch for containing dog food with a rear face, a front face, a bottom face, and a pair of bellowed side faces defining a open top and an interior space, the pouch having a lid flap integrally coupled at a first end thereof to a top of the rear face thereby allowing selective closure of the interior space of the pouch, the pouch further having a buckle connected to a second end thereof and a closed loop couple attached to the front face thereof for allowing the securement of the flap over the open top of the pouch, the pouch also including an attachment loop coupled to the rear face thereof for allowing the slidable coupling of the pouch to the waist strap.

2. A pet training device comprising:

at least one thigh strap with coupling means so that the top thigh strap may be worn about an upper extent of a thigh of a user;

at least one training strap having at least one couple for providing a releasable coupling between the thigh strap and a collar of a dog;

a waist strap with a first end having coupling means so that the waist strap may be worn about a waist of a user; and a connecting strap connected between the waist strap and the thigh strap with the connecting strap adapted to be vertically positioned against a front portion of a thigh of a user.

3. A pet training device as set forth in claim 2 and further including a pouch for containing dog food with a rear face, a front face, a bottom face, and a pair of bellowed side faces defining a open top and an interior space, the pouch having a lid flap integrally coupled at a first end thereof to a top of the rear face thereby allowing selective closure of the interior space of the pouch, the lid flap further having a buckle connected to a second end thereof and a closed loop couple attached to the front face thereof for allowing the securement of the flap over the open top of the pouch, the pouch also including an attachment loop coupled to the rear face thereof for allowing the slidable coupling of the pouch to the waist strap.

4. A pet training device as set forth in claim 2 and further including a second thigh strap.

5. A pet training device comprising:

at least one thigh strap with coupling means so that the top thigh strap may be worn about an upper extent of a thigh of a user;

at least one training strap having at least one couple for providing a releasable coupling between the thigh strap and a collar of a dog;

a plurality of training straps with various lengths; and a training strap storing mechanism including a strap formed in a closed-loop configuration with an O-ring coupled thereto, the strap of the training strap storing mechanism slidably coupled to the waist strap such that the training straps which are not in use may be attached to the O-ring thereof.

* * * * *